United States Patent [19]
Tang

[11] Patent Number: 5,497,268
[45] Date of Patent: Mar. 5, 1996

[54] HERMETICALLY SEALED POLISHED OPTICAL SURFACE

[75] Inventor: Chung L. Tang, Ithaca, N.Y.

[73] Assignee: Ithaca Research Corporation, Ithaca, N.Y.

[21] Appl. No.: 351,742

[22] Filed: Dec. 8, 1994

Related U.S. Application Data

[63] Continuation of Ser. No. 45,760, Apr. 14, 1993, abandoned.

[51] Int. Cl.⁶ .................................................. G02B 1/10
[52] U.S. Cl. ........................................... 359/513; 359/507
[58] Field of Search ................................. 359/507, 509, 359/512, 513, 642, 894, 580; 385/31, 50, 147, 91–94

[56] References Cited

U.S. PATENT DOCUMENTS 4,316,204  2/1982  Inagaki et al. ............................ 385/94
5,048,942  9/1991  Ohbayashi ............................... 359/507

FOREIGN PATENT DOCUMENTS 56-28571  3/1981  Japan ...................................... 359/507

OTHER PUBLICATIONS

Immersion Lens Assembly for Diode Laser—24231.
"Lens design fundamentals", Kingslake, Academic Press, New York, San Francisco, London 1978.
"Principles of Optics", Born et al. The MacMillan Company, New York, 1964, pp. 252–253.
English abstract of the Japanese Reference No. 56–28571.

*Primary Examiner*—Thong Q. Nguyen
*Attorney, Agent, or Firm*—Jones, Tullar & Cooper

[57] ABSTRACT

A method and apparatus for protecting polished surfaces of optical crystals includes placing a thin film of index-matching liquid between the polished surface and an optical flat, and hermetically sealing the liquid in place.

15 Claims, 1 Drawing Sheet

HERMETICALLY SEALED POLISHED OPTICAL SURFACE

This application is a continuation of U.S. application Ser. No. 08/045,760, filed Apr. 14, 1993, now abandoned.

BACKGROUND OF THE INVENTION

The present invention relates, in general, to optical crystals and more particularly to a method and apparatus for protecting polished surfaces of such crystals.

It is known that polished optical surfaces on hygroscopic crystals such as are used in electro-optic light modulators or other laser light applications, for example, can deteriorate very quickly when exposed to a humid atmosphere and, in the past, protection of such surfaces has been very difficult. Typically, a polished crystal has been protected by submerging it in an index-matching oil contained in a sealed liquid cell so that the oil prevents ambient humid air from reaching the crystal surface. Such a liquid cell has windows that allow light to reach the crystal, and the external surfaces of such windows typically are provided with anti-reflection coatings. Because electric fields are usually also applied to such crystals by way of electrodes on the crystals, such prior liquid-filled cells must be constructed to provide for such electrodes and for their corresponding electrical leads which must be brought into and out of the cells through the respective cell walls. Leak-proofing such a cell is difficult.

In addition, because light passing to and from the submerged optical crystal passes through the liquid cell, optical absorption in the liquid path produces the well-known "thermal blooming effect." As a result, maintenance of the optical beam profile at high light intensity levels is always a problem and can limit the use of such liquid cells to relatively low power levels. In spite of the foregoing problems, almost all commercial electro-optic modulators and Q-switches for lasers use one form or another of liquid cells of the same basic design.

SUMMARY OF THE INVENTION

It is an object of the present invention to provide a method for protecting the polished surface of an optical crystal without the need for submerging the crystal in a liquid cell.

It is a further object of the invention to provide apparatus for producing a thin protective film on a polished optical crystal surface and for hermetically sealing the film to protect the crystal surface.

Briefly, the present invention is directed to hermetically sealed polished optical surfaces of optical crystals, either hygroscopic or nonhygroscopic, and to a method of sealing such surfaces. Examples of commonly-used optical crystals are the so-called ADP-isomorphs, which include $NH_4H_2PO_4$, (Amonia Di-hydrogen Phosphate, or ADP), $KH_2PO_4$ (KDP), $NH_4D_2PO_4$, (deuterated ADP, OR AD*P), $KD_2PO_4$ (KD*P), $CsH_2AsO_4$ (CDA), $CsD_2AsO_4$ (CD*P), etc. or the borates such as $\beta$-$BaB_2O_4$ (BBO), $LiB_3O_5$ (LBO) etc., as well as others. The polished surfaces of the crystals are sealed by a thin film of a commercially available index-matching liquid, such as oil, which will not damage the crystal surface. Such liquids typically are a mixture of two inert organic liquids, one with a high index of refraction and the other with a low index. By using different proportions of these liquids in the mixture, an index ranging from, for example, 1.4 to 1.75 can be achieved. This liquid is placed in a protective region between a polished optical surface of the crystal and an adjacent corresponding inner surface of an "optical flat" which is a standard optical quality glass of fused or crystalline quartz having optically flat inner and outer surfaces which may or may not be parallel to each other. The optical flat has an inner surface approximately the same dimensions as the polished surface to be protected, has approximately the same index of refraction as the crystal and the liquid film, and also includes an anti-reflection coating on its outside surface. A small quantity of oil is introduced into the region between the polished surface of the crystal and the inner surface of the optical flat, and the optical flat is pressed against the crystal surface to cause the oil to spread and to form a thin, even film. The resulting liquid thin film serves the purposes of not only protecting the polished surface of the crystal but also of ensuring index matching between the surfaces of the crystal and the optical flat.

After the liquid thin film is in place, the optical flat is hermetically sealed to the crystal, as by a bead of sealant such as ultraviolet light-cured or thermally cured epoxy around the periphery of the oil-filled region between the flat and the crystal. After curing, the epoxy sealant holds the oil and the flat in place and prevents ambient air and moisture from displacing it, thereby ensuring protection of the polished surface of the crystal.

The presence of the index-matching oil film in the region between the opposed surfaces of the crystal and the optical flat eliminates air between them, thereby eliminating the large reflections at the interfaces produced when air is present. Such reflections are caused by the very different indices of refraction of air, the crystal and the optical flat. Furthermore, since air contains moisture which can damage the polished surface of the crystal, the elimination of air between these opposed surfaces also removes this source of damage.

BRIEF DESCRIPTION OF THE DRAWINGS

The foregoing and additional objects, features and advantages of the present invention will become apparent to those of skill in the art from the following detailed description of a preferred embodiment thereof, taken in conjunction with the accompanying drawings, in which.

DESCRIPTION OF PREFERRED EMBODIMENT

Figure 1:
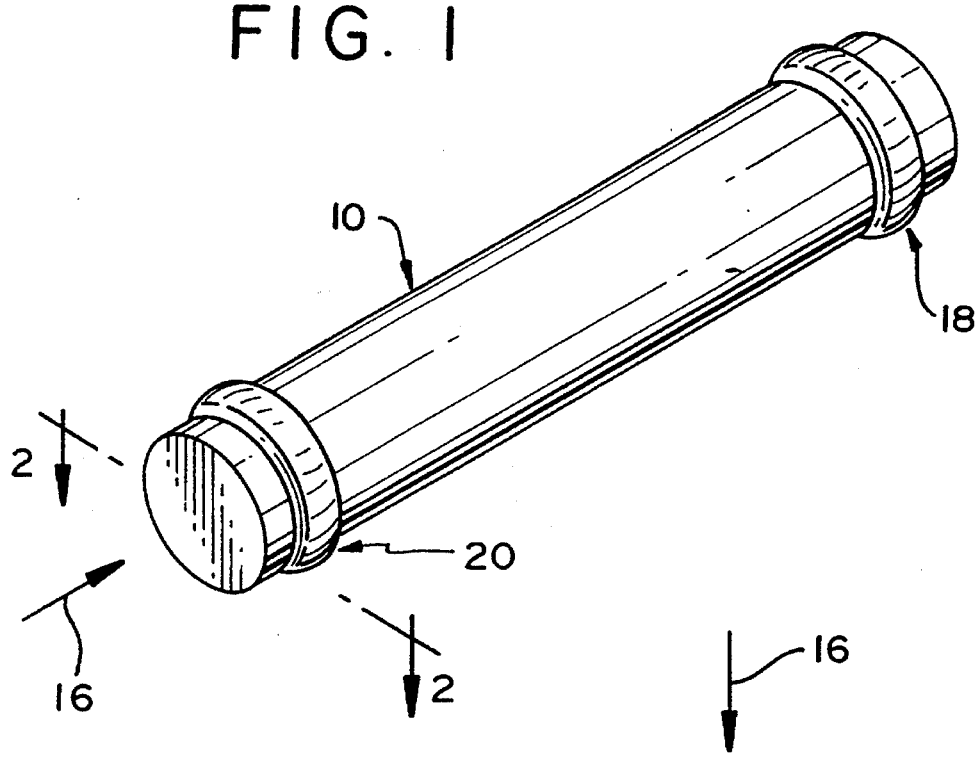
FIG. 1 is a perspective view of a rod-shaped crystal having a thin film of protective oil hermetically sealed to a polished surface thereof.
Figure 2:
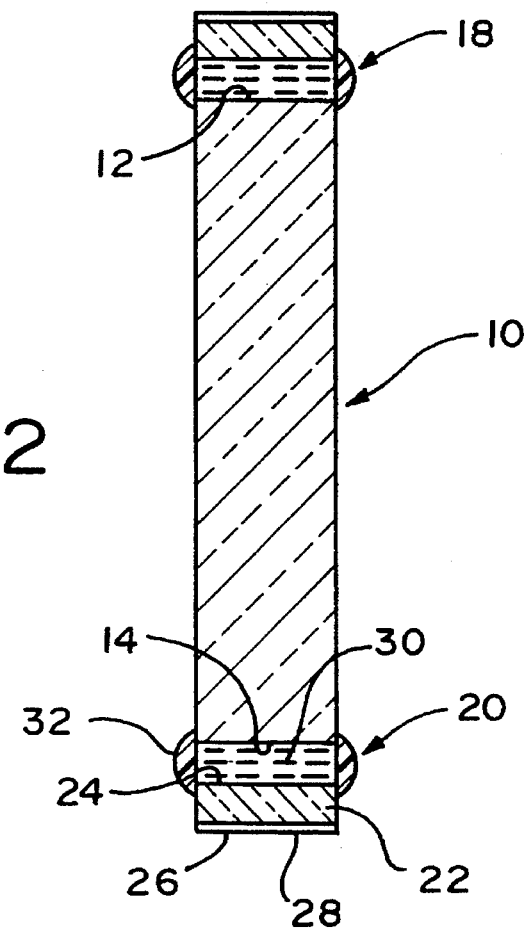
FIG. 2 is a cross-sectional view thereof, taken along line 2—2 of FIG. 1.

Referring now to the drawings, there is illustrated in FIG. 1 an optical crystal 10 having polished optical surfaces 12 and 14. The crystal 10 may be any hygroscopic crystal material suitable for use in an optical application, as noted above, for example KD*P, and is illustrated in the shape of a cylindrical rod having polished opposite end surfaces 12 and 14 which are perpendicular to the axis of the crystal. These optical end surfaces are subject to deterioration in a humid atmosphere and thus must be protected to preserve the optical quality of the crystal so that light beams can pass longitudinally through the crystal and through the polished surfaces as indicated by arrow 16.

The polished surfaces 12 and 14 are protected by means of sealing assemblies 18 and 20, respectively. Assembly 20 includes an optical flat 22 having inner and outer surfaces 24 and 26. The optical glass or like optical material of flat 22 is not subject to deterioration in the presence of humidity and is selected to have an index of refraction substantially the same as that of the crystal 10. The surfaces 24 and 26 of flat 22 need not be parallel to each other; in fact, there is usually a small wedge between them to avoid optical resonance in the flat. Preferably, a conventional, commercially available anti-reflection coating 28 is provided on the outer surface 26.

A thin layer 30 of index-matching liquid is located in the region between the inner surface 24 of flat 22 and the opposed end surface 14 of crystal 20, the liquid being selected to have an index of refraction substantially the same as that of the crystal. Any index-matching liquid with an index of approximately 1.5 can be used with the above-mentioned crystal materials. Such a liquid is commercially available as index-matching oil.

In fabricating the sealing assembly 20, the oil is placed on either of the opposed surfaces 14 or 24 and the flat 22 is pressed against the crystal to form a thin film of oil therebetween. The flat 22 is then sealed to the crystal 10, as by a bead 32 of UV-cured epoxy surrounding and closing the oil-filled region between the surfaces 14 and 24. The pressure on the oil film exerted by pressing the flat 22 against the polished optical surface 14 removes air and other contaminants from the oil-filled region, removes damaging humidity from the surface 14. The sealant 32 hermetically seals the region between surfaces 14 and 24 to prevent re-entry of air, water or other contaminants, thereby protecting the crystal surface from damage.

The thickness of the oil film 30 is microscopic, the exact thickness depending upon the flatness and smoothness of the two opposed surfaces. Since the optical flat and the crystal are pressed together, they are very close and the liquid layer is very thin. As a result, there is very little heat generated in it by optical absorption, so that thermal blooming is eliminated. Further, the structure allows the application of electrodes directly to the surfaces of the crystal for the application of electric fields to the crystal, in conventional manner, thereby avoiding the problem associated with the introduction of electrical leads and electrodes into and out of prior liquid cells.

It will be understood that the sealing assembly 18 is substantially identical to assembly 20. Further, the provision of anti-reflection coatings on the other surfaces of the optical flats effectively provides anti-reflection optical end surfaces for the crystal 10.

Although the invention has been described in terms of a preferred embodiment, it will be understood that variations and modifications can be made without departing from the true spirit and scope thereof, as defined in the following claims.

What is claimed is:

1. Apparatus for protecting a polished optical surface, comprising:
    a hygroscopic or nonhygroscopic crystal having a first index of refraction and having at least one polished optical surface to be protected lying in an optical path passing through said crystal;
    an optical flat having an outer surface and an inner optically flat surface adjacent said polished optical surface and lying in said optical path, said optical flat having an index of refraction substantially the same as the index of refraction of said crystal, said polished optical surface and said adjacent inner surface being closely spaced to define a protective region between said optical flat and said crystal in said optical path;
    a thin film liquid index-matched to said crystal in said protective region between said polished optical surface to be protected and said inner surface of said optical flat, said polished optical surface and adjacent inner surface being spaced sufficiently closely to place said liquid under pressure to thereby produce said thin film liquid and to drive air and moisture out of said thin film liquid; and
    sealing means surrounding said protective region and said optical path and engaging said optical flat and said crystal to secure said optical flat to said crystal to hermetically seal said protective region to prevent the escape of said thin film liquid and to maintain said liquid under sufficient pressure to prevent entry of ambient air or moisture.

2. The apparatus of claim 1, wherein said inner surface of said optical flat is coextensive with said polished surface.

3. The apparatus of claim 2, further including an anti-reflection coating on said outer surface of said optical flat.

4. The apparatus of claim 1, further including an anti-reflection coating on said outer surface of said optical flat.

5. The apparatus of claim 1, wherein said liquid is index-matching oil.

6. The apparatus of claim 5, wherein said crystal is rod shaped, said polished optical surface forming at least a first end thereof.

7. The apparatus of claim 5, wherein said sealing means is a bead of adhesive sealant.

8. Apparatus for protecting a polished optical surface, comprising:
    a hygroscopic or nonhygroscopic crystal having a first index of refraction wherein said crystal has two polished optical surfaces to be protected lying in an optical path passing through said crystal;
    an optical flat having an outer surface and an inner optically flat surface adjacent each said polished optical surface and lying in said optical path, each said optical flat having an index of refraction substantially the same as the index of refraction of said crystal, and each said inner optically flat surface being closely spaced to its adjacent polished optical surface to define a corresponding protective region in said optical path;
    a thin film liquid index-matched to said crystal and lying in said protective region between each optical flat inner surface and its adjacent polished optical surface to be protected, said polished optical surface and adjacent inner surface being spaced sufficiently closely to place said liquid under pressure to thereby produce said thin film liquid and to drive air and moisture out of said thin film liquid;
    first and second adhesive beads hermetically surround and sealing said protective region and said optical path and engaging each said optical flat and said crystal and surround corresponding protective regions to secure said optical flat to said crystal to hermetically seal said protective region to prevent the escape of said thin film liquid and to maintain said liquid under sufficient pressure to prevent entry of ambient air or moisture; and
    antireflection coatings on said outer surfaces of said optical flats.

9. The apparatus of claim 8 wherein said inner and outer surfaces of each of said first and second optical flats are nonparallel.

10. Apparatus for protecting polished surfaces of an optical crystal through which light is to be directed, comprising:
    a hydroscopic or nonhydroscopic optical crystal having a first index of refraction, having a peripheral surface and having first and second polished optical surfaces, said surfaces defining opposite ends of an optical path passing through said crystal;

a first thin film layer of liquid covering said first polished optical surface, said liquid having an index of refraction matched to said first index of refraction of said crystal;

a second thin film layer of said liquid covering said second polished optical surface;

a first optical flat having a first optical axis and substantially parallel inner and outer optically flat surfaces substantially perpendicular to said first optical axis, said first optical flat surfaces being of substantially the same dimensions as said first polished optical surface, said first optical flat being positioned closely adjacent to said first polished optical surface to provide a first thin film protective region therebetween containing said first thin film layer of liquid;

a first annular seal for engaging said first optical flat and engaging said peripheral surface of said crystal adjacent said first optical surface to secure said first optical flat to said crystal and to seal said first thin film layer under pressure within said first protective region between said first optical surface and said inner surface of said first optical flat to align said first optical axis with said crystal optical path and to prevent ambient air and moisture from displacing said first thin film liquid layer;

a second optical flat having a second optical axis and substantially parallel inner and outer optically flat surfaces substantially perpendicular to said second optical axis, said second optical flat surfaces being of substantially the same dimensions as said second polished optical surface, said second optical flat being positioned closely adjacent to said second polished optical surface to provide a second thin film protective region therebetween containing said second thin film layer of liquid; and a second annular seal for engaging said second optical flat and engaging said peripheral surface of said crystal adjacent said second optical surface to secure said second optical flat to said crystal and to seal said second thin film layer under pressure within said second protective region between said second optical surface and said inner surface of said second optical flat to align said second optical axis with said crystal optical path and to prevent ambient air and moisture from displacing said second thin film liquid layer.

11. The apparatus of claim 10, wherein each of said first and second annular seals comprises an adhesive bead which hermetically seals its corresponding protective region.

12. The apparatus of claim 10, wherein said crystal is generally rod-shaped having first and second ends comprising said opposite ends of said optical path and wherein said first and second polished optical surfaces are located at said first and second ends, respectively.

13. The apparatus of claim 10 wherein each said optical flat has an index of refraction matched to the index of refraction of said crystal.

14. The apparatus of claim 10, wherein each said thin film layer of liquid is an index-matching oil having a microscopic thickness.

15. The apparatus of claim 10, wherein each of said first and second seals comprises a bead of epoxy for hermetically sealing said first and second protective regions, respectively.

* * * * *